United States Patent [19]

Rodgers, Jr.

[11] Patent Number: 5,743,834
[45] Date of Patent: Apr. 28, 1998

[54] STATIONARY EXERCISE APPARATUS WITH ADJUSTABLE CRANK

[76] Inventor: Robert E. Rodgers, Jr., 8011 Meadowcroft, Houston, Tex. 77063

[21] Appl. No.: 841,123

[22] Filed: Apr. 29, 1997

Related U.S. Application Data

[63] Continuation-in-part of Ser. No. 602,952, Feb. 16, 1996, Pat. No. 5,683,333, which is a continuation of Ser. No. 377,846, Jan. 25, 1995, Pat. No. 5,573,480.

[51] Int. Cl.⁶ .......................... A63B 69/16; A63B 22/04
[52] U.S. Cl. .......................... 482/57; 482/51
[58] Field of Search .......................... 482/51, 52, 53, 482/57, 70, 71, 79, 80, 60, 62, 908

[56] References Cited

U.S. PATENT DOCUMENTS

| | | |
|---|---|---|
| 219,439 | 9/1879 | Blend . |
| 2,603,486 | 7/1952 | Hughes . |
| 3,316,898 | 5/1967 | Brown . |
| 3,432,164 | 3/1969 | Deeks . |
| 3,759,511 | 9/1973 | Zinkin et al. . |
| 4,053,173 | 10/1977 | Chase, Sr. . |
| 4,188,030 | 2/1980 | Hooper . |
| 4,379,566 | 4/1983 | Titcomb . |
| 4,456,276 | 6/1984 | Bortolin . |
| 4,509,742 | 4/1985 | Cones . |
| 4,555,109 | 11/1985 | Hartmann . |
| 4,561,318 | 12/1985 | Schirrmacher . |
| 4,645,200 | 2/1987 | Hix . |
| 4,679,786 | 7/1987 | Rodgers . |
| 4,720,093 | 1/1988 | Del Mar . |
| 4,869,494 | 9/1989 | Lambert, Sr. . |
| 4,900,013 | 2/1990 | Rodgers, Jr. . |
| 4,949,954 | 8/1990 | Hix . |
| 4,949,993 | 8/1990 | Stark et al. . |
| 4,989,857 | 2/1991 | Kuo . |
| 5,039,087 | 8/1991 | Kuo . |
| 5,039,088 | 8/1991 | Shifferaw . |
| 5,131,895 | 7/1992 | Rogers, Jr. . |
| 5,135,447 | 8/1992 | Robards, Jr. et al. . |
| 5,186,697 | 2/1993 | Rennex . |
| 5,242,343 | 9/1993 | Miller . |
| 5,290,211 | 3/1994 | Stearns . |
| 5,295,928 | 3/1994 | Rennex . |
| 5,299,993 | 4/1994 | Habing . |
| 5,383,829 | 1/1995 | Miller . |
| 5,401,226 | 3/1995 | Stearns . |
| 5,423,729 | 6/1995 | Eschenbach . |
| 5,527,246 | 6/1996 | Rodgers, Jr. . |
| 5,529,555 | 6/1996 | Rodgers, Jr. . |
| 5,540,637 | 7/1996 | Rodgers, Jr. . |
| 5,549,526 | 8/1996 | Rodgers, Jr. . |
| 5,562,574 | 10/1996 | Miller .................... 482/52 |
| 5,573,480 | 11/1996 | Rodgers, Jr. . |
| 5,577,985 | 11/1996 | Miller .................... 482/51 |
| 5,591,107 | 1/1997 | Rodgers, Jr. . |
| 5,593,371 | 1/1997 | Rodgers, Jr. . |
| 5,593,372 | 1/1997 | Rodgers, Jr. . |
| 5,595,553 | 1/1997 | Rodgers, Jr. . |
| 5,611,757 | 3/1997 | Rodgers, Jr. . |

FOREIGN PATENT DOCUMENTS

DT 2919-494  5/1979  Germany .

*Primary Examiner*—Stephen R. Crow
*Attorney, Agent, or Firm*—Pravel, Hewitt, Kimball & Krieger

[57] ABSTRACT

An exercise apparatus which promotes cardiovascular exercise yet provides minimal impact on critical joints. A base structure is provided which supports a pair of reciprocating members that are displaced in a generally reciprocating manner at one end yet orbit at the other end through a coupler assembly attached to the frame. The coupler assembly includes a mechanism to variably adjust the radius of the arcuate motion while the device is in use. A structure is included which permits each foot of the user to move in a generally closed path during the exercise. By being able to continuously variably adjust the size of the orbit, the user can fine tune the height and length of the closed path which redefines the foot motion to a preferred path for the anatomy of the particular user.

13 Claims, 2 Drawing Sheets

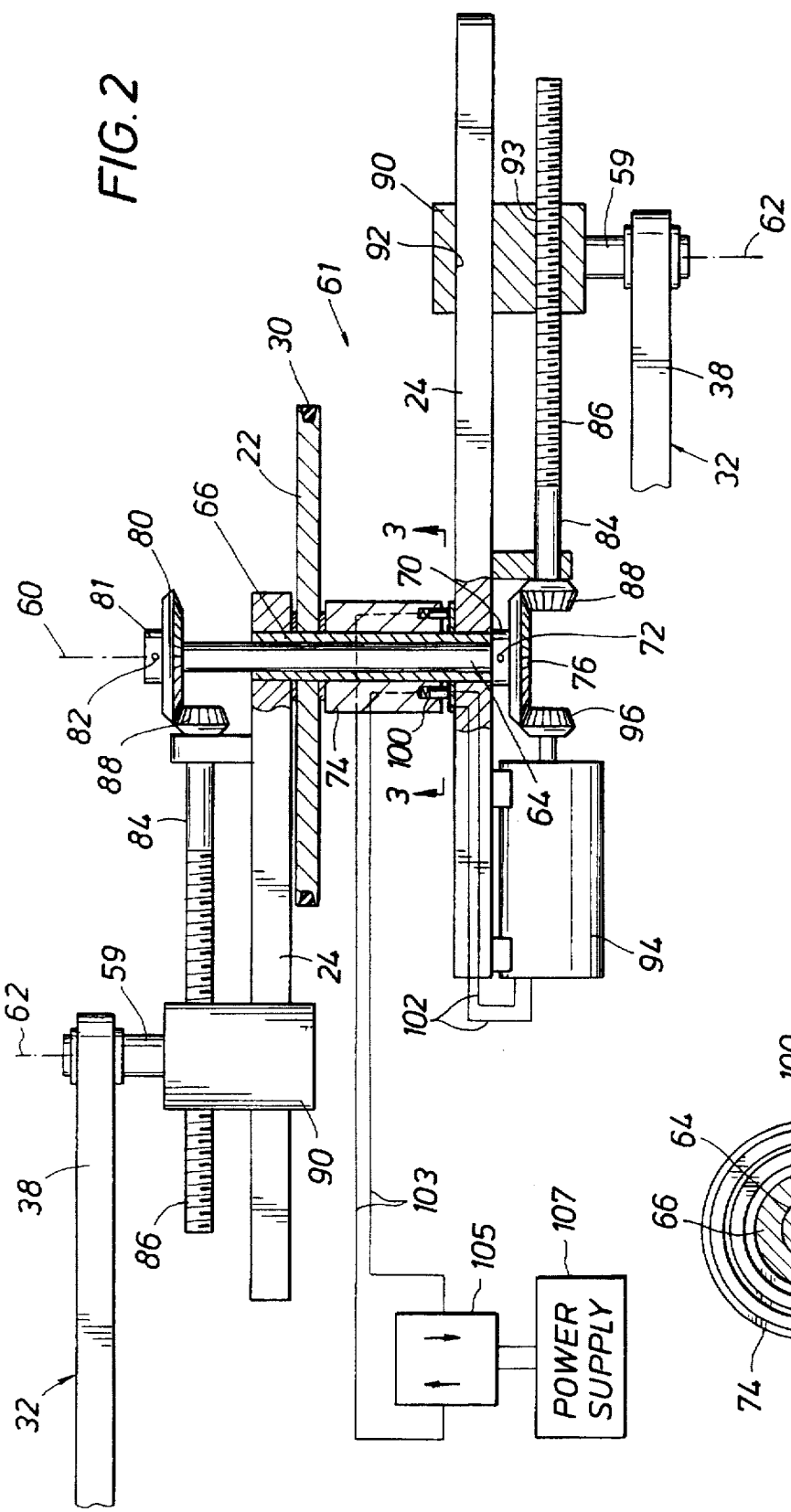

STATIONARY EXERCISE APPARATUS WITH ADJUSTABLE CRANK

CROSS-REFERENCE TO RELATED APPLICATION

This is a continuation-in-part application of U.S. patent application Ser. No. 08/602,952 filed Feb. 16, 1996 now U.S. Pat. No. 5,683,333 which is a continuation of U.S. patent application Ser. No. 08/377,846 filed Jan. 25, 1995 and issued as U.S. Pat. No. 5,573,480 on Nov. 12, 1996.

BACKGROUND OF THE INVENTION

1. Field of the Invention

The present invention relates to an improved stationary exercising apparatus generating a closed exercise path for the feet of the user. More particular, the present invention relates to an improved exercise apparatus having a remotely variable crank mechanism enabling the user to vary the size of the path to more accurately accommodate the particular user's anatomy.

2. Description of the Prior Art

Stair climbing is a popular form of exercise for the cardiovascular system. However, over prolonged use it can overstress the hips, knees and ankles. Walking is also a popular form of exercise but it does not load the cardiovascular system to the extent stair climbing does. The prior art includes apparatus which enable the user to move his feet in a generally elliptical path to more accurately represent the body motion associated with climbing stairs or an inclined ramp. See, for example, U.S. Pat. Nos. 5,573,480; 5,540,637; 5,593,371; 5,593,372; 5,549,526; and 5,595,553.

Occasionally, it is necessary to adjust the linkages of such prior art apparatus to accommodate the particular anatomy of the user, such as height and leg length. The prior art discloses a mechanism for manually adjusting portions of a stationary exercise apparatus to accommodate the particular anatomy of the user. See U.S. Pat. No. 5,529,555. However, the prior art requires that the user stop the exercise program and manually readjust the length of the crank or other linkages. Therefore, the need exists for an automatic mechanism which permits the user to adjust the crank mechanism or other linkages of an exercise apparatus preferably while the exercise apparatus is in use.

SUMMARY OF THE INVENTION

Briefly, the invention relates to an improved exercise apparatus which provides for remote activation to variably adjust the apparatus to accommodate the particular anatomy of a user while in use. A frame is provided having a base portion adapted to be supported by the floor. Two reciprocating members are positioned in spaced relationship to the frame. At least a portion of one end of each reciprocating member is adapted for substantially reciprocating motion. A coupler assembly is supported by the frame which defines a pivot axis and includes means for connecting the other end of each of the reciprocating members relative to the pivot axis.

The present invention also includes means associated with each reciprocating member for supporting a foot of the user so that during operation of the apparatus, each foot of the user follows a predetermined closed path. The present invention further includes means for variably adjusting the geometry of the predetermined closed path permitting the user to select a preferable closed path based on the user's anatomy. The variably adjusting means is done remotely by the user. It comprises an adjustable crank for each reciprocating member which generally extends from the pivot axis to that end of the reciprocating member it is connected to. The crank is capable of changing its length thereby increasing or decreasing the radius of the arcuate path about the pivot axis which in turn influences the height and length of the closed path followed by each foot of the user.

The adjustable means may include a motor which drives a gear arrangement to increase or decrease the length of the crank. This activity may occur while the unit is in use enabling the user to variably adjust on a continuous basis the height and length of the closed path to a preferred anatomical pattern for the particular user.

The more important features of this invention have been summarized rather broadly in order that the detailed description may be better understood. There are, of course, additional features of the invention which will be described hereafter and which will also form the subject of the claims appended hereto.

BRIEF DESCRIPTION OF THE DRAWINGS

In order to more fully describe the drawings used in the detailed description of the present invention, a brief description of each drawing is provided.

FIG. 2 is a cross-sectional view taken along line 2—2 of FIG. 1 illustrating the preferred embodiment of the present invention in more detail.

FIG. 3 is a cross-sectional view taken along line 3—3 of FIG. 2.

DETAILED DESCRIPTION OF PRESENT INVENTION

Figure 1:
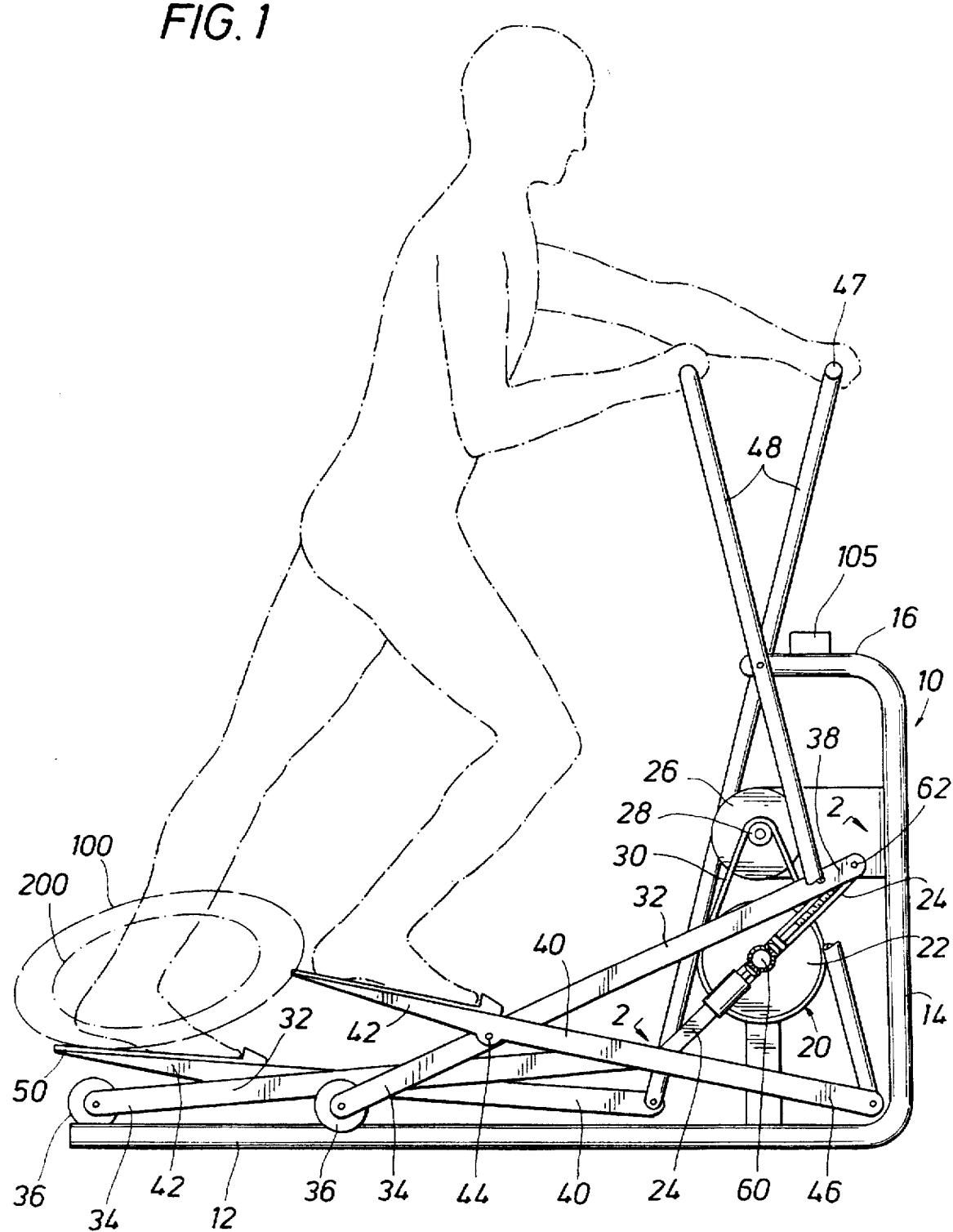
FIG. 1 is an elevation view of a stationary exercise apparatus including the preferred embodiment of the present invention.

Referring to FIG. 1, a frame 10 comprises a base portion 12, a mid portion 14, and a top portion 16. A coupler assembly 20 is fixed relative to the frame and comprises a pulley 22, crank members 24, resistant brake 26, sheave 28 and belt 30. Two reciprocating members 32 are positioned in the lower proximity of frame 10. Each reciprocating member 32 has one end 34 which is adapted to move in a substantially reciprocating motion. A roller 36 is mounted at each end 34 of reciprocating member 32 and is adapted to ride on base portion 12 of frame 10. Alternatively, roller 36 may directly engage the floor, if desirable. The other end 38 of each reciprocating member 32 is connected to one end of a crank 24.

The present invention may also include two foot members, or contact members, 40. Each foot member 40 is pivotally attached proximate a first end 42 through a pin connection 44 to a reciprocating arm 32. A foot pad 50 is attached to the top of each foot member 40 at its first end 42. Each foot member 40 is pivotally attached at its other end 46 to an arm member 48. Each arm member 48 is also pivotally attached proximal its other end to top portion 16 of frame 10. A handle portion 47 is included at the top end of each hand member 48.

Referring now also to FIGS. 2 and 3, the variable crank mechanism 61 of the present invention will be described. As noted above, each crank 24 is connected to end 38 of a reciprocating member 32 by a block member 90/pin 59. This connection occurs at axis 62. The other end of each crank 24 pivots about pivot axis 60. Axis 60 is defined principally by a crank shaft 66 which is fixedly attached at each end to a crank 24. Crank shaft 66 is supported for rotation within housing 74 which is fixed to frame 10. Pulley 22 is attached to shaft 66 and may, therefore, rotate with crank shaft 66 and cranks 24. A drive shaft 64 is also coaxially aligned within crank shaft 66 about axis 60. Drive shaft 64 is supported by crank shaft 66. A bevelled gear 76 is attached at one end to drive shaft 64 by hub 70 which fits over drive shaft 64 and is fixed relative to drive shaft 64 by a set screw 72 or similar piece. At the other end of drive shaft 64, it passes through the other end of crank shaft 66 and is attached to bevelled gear 80. Once again, bevelled gear 80 may be held fixed relative to drive shaft 64 through the use of a hub 81/set screw 82.

A threaded rod 84 is affixed generally to each crank 24. Each rod 84 has threads 86 at one end and a smaller bevelled gear head 88 at its other end. Each bevelled gear head 88 is adapted to threadably engage bevelled drive gears 76 or 80 as shown in FIG. 2. A member 90 is shown slidably engaged with each crank 24 proximate each axis 62. Each member 90 has a slot 92 through which a crank 24 passes. At the other end of member 90 is a threaded aperture 93 adapted to threadably engage threads 86 of a rod 84. Pin 59 is fixed within member 90 and adapted to rotate relative to member 32.

An electric motor 94 is mounted at one end of one crank 24. Motor 94 rotates a bevelled gear 96 adapted to engage bevelled gear 76. Referring also to FIG. 3, motor 94 receives its electrical power through slip rings 98/99 which contact leads 100. Each slip ring 98/99 connects to a wire 102 which is in turn connected to motor 94. As shown in FIG. 2, each lead 100 may be spring biased to engage slip rings 98/99. Wires 103 connect each lead 100 with a control console 105. Control console 105 is in turn in electrical contact with a power supply 107. Preferably, control console 105 is mounted to frame 10 in a convenient location enabling the operator to easily adjust the present invention in accordance with the description provided herein.

Thus, the user pushes buttons mounted on console 105 in the direction of either arrow as shown. As a result of power supplied by source 107 and contacts between leads 100 and slip rings 98/99, motor 94 is activated. Since motor 94 is bidirection and depending on which button is pushed (in the direction of the up or down arrow on control module 105), the motor will either rotate bevel gear 96 in one direction or the other direction. Rotation of gear 96 rotates gear 76. Rotation of gear 76 in turn causes rotation of drive shaft 64 which also rotates gear 80 at the distal end of drive shaft 64. In this manner, both bevelled gears 76 and 80 rotate at the same angular velocity enabling consistent rotation of smaller heads 88 of each threaded rod 84. Such in turn will move members 90/pins 59, and in turn each axis 62, toward axis 60 or away from axis 60 at a uniform speed. Thus, the user may adjust the distance from axis 60 to each axis 62 on a continuous basis and not be limited to particular settings based on preset mechanical stops as shown in U.S. Pat. No. 5,529,555.

Referring now to FIGS. 1-3, during operation, the user ascends the present invention and begins a climbing or walking motion which results in displacement of first ends 34 of each reciprocating member 32. Simultaneously, the second end 38 of each reciprocating member 32 orbits about the pivot axis 60. The orbit of ends 38 about axis 60 may be generally circular in motion. However, at points between opposite ends 34 and 38 of each reciprocating member 32, the motion gradually changes from a generally more circular motion at ends 38, for example, to a more linear or reciprocating motion at ends 34. This geometric transition results in the form of an approximate ellipse at each foot pad 50. It is not a perfect ellipse; it tends to be slightly egg-shaped. However, it provides a more natural and rythmitic body movement. With respect to FIG. 1, such a first ellipse may be in the shape of a closed path 100.

In accordance with the present invention, during operation, the user may activate bidirectional motor 94 in accordance with the foregoing description which therefore increases or decreases the distance between axis 60 and each axes 62. Such a change will influence the shape and size of path 100. For example, if the distance between axes 60 and 62 is decreased, the ellipse will also decrease in height and length as generally shown by path 200. Thus, it will be apparent to one skilled in the art that by using the present invention, each user may remotely vary the length of each crank 24 on a continuous basis to fine tune the height and length of the closed path or ellipse. The user may wish to do so at the beginning of the exercise to select a shaped ellipse which is more suitable for his or her anatomy or may wish to vary the size of the ellipse to change the stride as the user becomes more fatigued during the exercise, for example.

Resistant brake 26 of coupler assembly 20 serves to increase or decrease the load on pulley 22 through the sheave 28/belt 30/arrangement. Thus, the user may also increase or decrease the amount of energy expended to perform the exercise.

The present invention as generally shown in FIGS. 2 and 3 has been described with respect to its application on an exercise apparatus as generally shown in FIG. 1. However, it should be understood that the use of a variable crank as generally shown in FIGS. 2 and 3 need not be limited to the exercise apparatus as shown in FIG. 1. For example, the present invention may be used in other exercise apparatus such as those illustrated in U.S. Pat. Nos. 5,540,637; 5,593, 371; 5,593,372; 5,549,526; 5,611,757; 5,527,246; 5,595, 553; 5,591,107; and 5,611,758, which patents are all hereby incorporated by reference and made a part of this application for purposes of this disclosure.

Modifications and alterations to the embodiment disclosed herein will be apparent to those skilled in the art in view of this disclosure. It is intended that all such variations and modifications fall within the spirit and scope of the present invention as claimed.

What is claimed is:

1. An apparatus for exercising comprising:
   a frame having a base portion adapted to be supported by a floor;
   first and second reciprocating members, each reciprocating member having a first end and a second end, a portion of each said reciprocating member adapted for substantially reciprocating motion;
   a coupler assembly supported by said frame defining a pivot axis and having means for connecting said second end of each said reciprocating member relative to said pivot axis so that said second ends of each said reciprocating member orbit about said pivot axis while a portion of each of said first and second reciprocating member distal said second ends of each said reciprocating member moves in a substantially reciprocating motion;
   means operatively associated with said reciprocating members for supporting the bottom of the foot of the user so that during operation of the apparatus each foot of the user follows a predetermined closed path; and
   means for variably adjusting the geometry of said predetermined closed path allowing the user to select a closed path having a preferred anatomical pattern while the apparatus is in use.

2. An apparatus for exercising comprising:
a frame having a base portion adapted to be supported by a floor;
first and second reciprocating members, each reciprocating member having a first end and a second end, a portion of said reciprocating members adapted for substantially reciprocating motion;
a coupler assembly supported by said frame defining a pivot axis and having crank members for connecting said second ends of said each reciprocating member relative to said pivot axis and for variably adjusting the distance from said second ends of each said reciprocating member to said pivot axis so that a portion of each of said reciprocating member distal said second end of each said reciprocating member moves in a substantially reciprocating motion; and
means operatively associated with said reciprocating members for supporting the bottom of the foot of the user of the apparatus so that during operation of the apparatus each foot of the user follows a closed path,
wherein the user may remotely adjust the distance from each said second end of said reciprocating member to said pivot axis changing the geometry of said predetermined closed path to accommodate the preferred anatomical pattern of the user.

3. An apparatus for exercising comprising:
a frame having a base portion adapted to be supported by a floor;
first and second reciprocating members, each reciprocating member having a rear end and a front end, a portion of said reciprocating members adapted for a substantially reciprocating motion;
a coupler assembly supported by said frame defining a pivot axis and having crank members, each crank member adapted to revolve about the pivot axis at one end and to displace a reciprocating member from the other end of the crank member so that a portion of each said reciprocating member proximate the rear end of each reciprocating member moves in a substantially reciprocating motion while the one end of each crank member revolves about the pivot axis;
each means associated with said crank member continuous remote adjustment by the user to change the distance from the front end of each reciprocating member to the pivot axis; and
means operatively associated with said reciprocating members for supporting the bottom of the foot of the user so that during operation of the apparatus each foot of the user follows a closed path.

4. The exercise apparatus according to claim 3 wherein each said crank member comprises:
a first element adapted at one end to rotate about said pivot axis and connected at its other end proximate the front end of said first reciprocating member; and
a second element adapted at one end to rotate about said pivot axis and connected at its other end proximate the front end of said second reciprocating member.

5. The exercise apparatus according to claim 4 wherein said first element comprises a pin at its other end to engage the front end of said first reciprocating member, a threadable member adapted to displace said pin along said first element relative to said pivot axis, and a motor adapted to rotate said threadable member enabling the displacement of said pin relative to said pivot axis.

6. The exercise apparatus according to claim 5 wherein said second element comprises a pin at its other end to engage the front end of said second reciprocating member, a threadable member adapted to displace said pin along said second element relative to said pivot axis, and a gear adapted to rotate said threadable member enabling the displacement of said pin of said second element relative to said pivot axis wherein said gear of said second element being driven by said motor of said first element.

7. In an exercise apparatus having first and second reciprocating members, one end of each reciprocating member adapted for substantially reciprocating motion and the other end adapted for arcuate motion about a common axis and having means operatively associated with each reciprocating member for supporting the bottom of the foot of the user so that during operation of the apparatus each foot of the user follows a predetermined closed path, the exercise apparatus further comprising means for adjusting the distance from the other end of each reciprocating member to the common axis while the apparatus is in use allowing the user to selectively adjust the geometry of the closed path to a preferred anatomical pattern of the particular user.

8. The exercise apparatus according to claim 7 wherein said adjusting means comprises:
a first element adapted at one end to rotate about said pivot axis and connected at its other end to the other end of said first reciprocating member; and
a second element adapted at one end to rotate about said pivot axis and connected at its other end to the other end of said second reciprocating member.

9. The exercise apparatus according to claim 8 wherein said first element comprises a pin at its other end to engage the other end of said first reciprocating member, a threadable member adapted to displace said pin along said first element relative to said pivot axis, and a motor adapted to rotate said threadable member enabling the displacement of said pin relative to said pivot axis.

10. The exercise apparatus according to claim 9 wherein said second element comprises a pin at its other end to engage the other end of said second reciprocating member, a threadable member adapted to displace said pin along said second element relative to said pivot axis, and a gear adapted to rotate said threadable member enabling the displacement of said pin of said second element relative to said pivot axis wherein said gear of said second element being driven by said motor of said first element.

11. An apparatus for exercising comprising:
a frame having a base portion adapted to be supported by a floor;
first and second reciprocating members, each reciprocating member having a first end and a second end, a portion of said reciprocating members adapted for a substantially reciprocating motion;
a coupler assembly supported by said frame defining a pivot axis, a first element having one end adapted to rotate about said pivot axis and connected at its other end to the second end of said first reciprocating member, and a second element having one end adapted to rotate about said pivot axis and connected at its other end to the second end of said second reciprocating member so that as the other ends of each said first and second element move in an arcuate path about said pivot axis said portion of each of said reciprocating member distal said second end of each said reciprocating member moves in a substantially reciprocating motion;
said first and second elements being variably adjustable remotely by the user to change the distance from said second ends of each said reciprocating member to said pivot axis; and means operatively associated with said reciprocating members for supporting the bottom of the foot of the user so that during operation of the apparatus each foot of the user follows a closed path, wherein the user may adjust the length of said first and second elements thereby changing the geometry of said closed path for a preferred anatomical pattern for that user.

12. The exercise apparatus according to claim 11 wherein said first element comprises a pin at its other end to engage the second end of said first reciprocating member, a threadable member adapted to displace said pivot pin along said first element relative to said pivot axis, and a motor adapted to rotate said threadable member enabling the displacement of said pin relative to said pivot axis.

13. The exercise apparatus according to claim 12 wherein said second element comprises a pin at its other end to engage said second end of said second reciprocating member, a threadable member adapted to displace said pin along said second element relative to said pivot axis, and a gear adapted to rotate said threadable member enabling the displacement of said pin of said second element relative to said pivot axis wherein said gear of said second element being driven by said motor of said first element.

* * * * *